VARIABLE FREQUENCY DIVIDING SYSTEM

Filed June 10, 1957 3 Sheets-Sheet 1

VARIABLE FREQUENCY DIVIDING SYSTEM

Filed June 10, 1957 3 Sheets-Sheet 2

2,944,219

VARIABLE FREQUENCY DIVIDING SYSTEM

Isokazu Tanaka, Shizuo Kurimura, and Shigeo Yamazaki, all of Tokyo-to, Japan, assignors to Kabushiki-Kaisha Koden Seisakusho, Tokyo-to, Japan Filed June 10, 1957, Ser. No. 664,799
Claims priority, application Japan June 20, 1956
1 Claim. (Cl. 328—134)

This invention relates to a system for controlling the phase of frequency divided electric wave of a phantastron circuit, said and other electric waves will be described merely as "wave" in the following descriptions.

In the conventional system for variably dividing any wave, for instance, in the Loran receiving system, eight repeating periods being successively shortened by 100 μs. are necessary per each of three standard repeating periods $S_0$, $L_0$ and $H_0$ ($S_0$=50,000 μs., $L_0$=40,000 μs. and $H_0$ =30,000 μs.), so that total number of the necessary repeating periods is twenty four. For obtaining such a plurality of the repeating periods as described above, the following systems have been adopted conventionally.

(*a*) A system in which a frequency dividing circuit is formed by cascade connection of several frequency dividing elements, and the resultant frequency dividing ratio is made to vary by variation of the frequency dividing ratio of each of said elements.

(*b*) A system in which a pulse feedback circuit is arranged in the circuit of the frequency divider so as to vary the frequency dividing ratio, and the repeating periods as described already are made to be obtained from the standard period of 100 kc./s. which has been introduced in the above-mentioned frequency divider.

The above-mentioned conventional systems for the variation of the frequency dividing ratio have disadvantages in that in the former system (*a*) in which the frequency dividing ratio of each frequency dividing element is made to vary, the resultant frequency dividing ratio becomes the product of the frequency dividing ratios of all elements, so that minute adjustment of the resultant frequency dividing ratio is difficult; and in that the latter system (*b*) is complicate in its construction and unstable in its operation.

Therefore, an essential object of this invention is to provide a system for the control of the phase of a frequency divided wave, in which the frequency dividing ratio can be varied without being accompanied with the above-mentioned disadvantages of the conventional systems.

In the following, the conventional phase synchronizing system will be explained.

For the automatic synchronization of the phase of a wave to be controlled with that of a standard wave, there are two systems of static and astatic types.

In the conventional static system, a direct current voltage corresponding to the phase difference between the standard wave and the wave to be controlled is made to generate, for example, by use of a phase discriminator; and said generated voltage is introduced into a variable reactance element such as reactance tube so as to vary the impedance of said element in such a manner that the phase of the wave to be controlled passing through said element can be made synchronous to that of the standard wave. This system, however, has a disadvantage in that although its construction is relatively simple, the direct current output of the phase discriminator disappears upon disappearance of the standard wave, whereby the control power imparted to the variable reactance element disappears and the phase of the wave to be controlled is restored to its inherent phase differing entirely from that of the standard wave.

On the other hand, in the conventional astatic system is used a mechanical control device, such as goniometer, which is arranged in the place of the variable reactance element so that said device may be controlled mechanically by the torque due to direct current output voltage of the phase discriminator. In this system, although the control torque disappears upon disappearance of the standard wave, the control device maintains the status thereof as it is, so that the wave to be controlled is maintained continuously in its synchronized state without the disadvantage of the static system. However, this system is complicated in its construction and is liable to bring a defective hunting phenomenon.

Therefore, another object of this invention is to provide an automatic phase synchronizing circuit, in which the wave to be controlled can be synchronized rapidly and stably with the standard wave having a frequency below several kilocycle per second, and said wave to be controlled can be maintained continuously in its synchronized state even when the standard wave is made to disappear, said operations being achieved by use of a simple device comprising thermionic tubes.

Said objects and other objects of this invention have been attained by the system, in which a rectangular wave or pulse having a desirable time width is applied to the phantastron circuit so as to stop the frequency dividing function of said circuit for a time corresponding to said time width; and the phase of the frequency divided output wave of said circuit is made to be controlled in accordance with said time width.

The characteristic operation of this invention is revealed particularly in the following cases.

(*a*) This invention is suitable for dividing variably the frequency of any electric frequency dividing system. In this case, a cut pulse (control pulse) is supplied to the phantastron circuit forming the elemental circuit of the front stage of the frequency dividing circuit to stop the function of said phantastron circuit for the period of the pulse duration. According to this system, the frequency dividing ratio can be controlled by varying the time duration of said pulse.

(*b*) This invention is suitable for an automatic phase synchronizing system. In this case, the phase difference between the output wave to be controlled, said wave being obtained by dividing a stable high frequency pulse by a frequency dividing circuit comprising a phantastron circuit, and a standard input wave is detected so as to produce a control pulse having a time width corresponding to said phase difference; and phase synchronization is established by making the phase of the output wave of the above-mentioned frequency dividing circuit lag by means of said produced control pulse.

The principle, construction and operation of this invention together with further objects and advantages thereof may best be understood by reference to the following description, taken in connection with the accompanying drawings, in which:

Fig. 1 is a schematic diagram of an embodiment, in which the system of this invention is employed as a frequency divider for a Loran receiver.

Fig. 2(*a*) and 2(*b*) show the voltage wave forms for describing the operation of the circuit illustrated in Fig. 1.

Fig. 3 is a block diagram for indicating a variable frequency dividing circuit, in which the system of this invention is applied.

Fig. 4 is a schematic diagram for indicating an embodiment of an automatic phase synchronizing circuit, in which the system of this invention is applied for.

Figures 1, 3, 4:
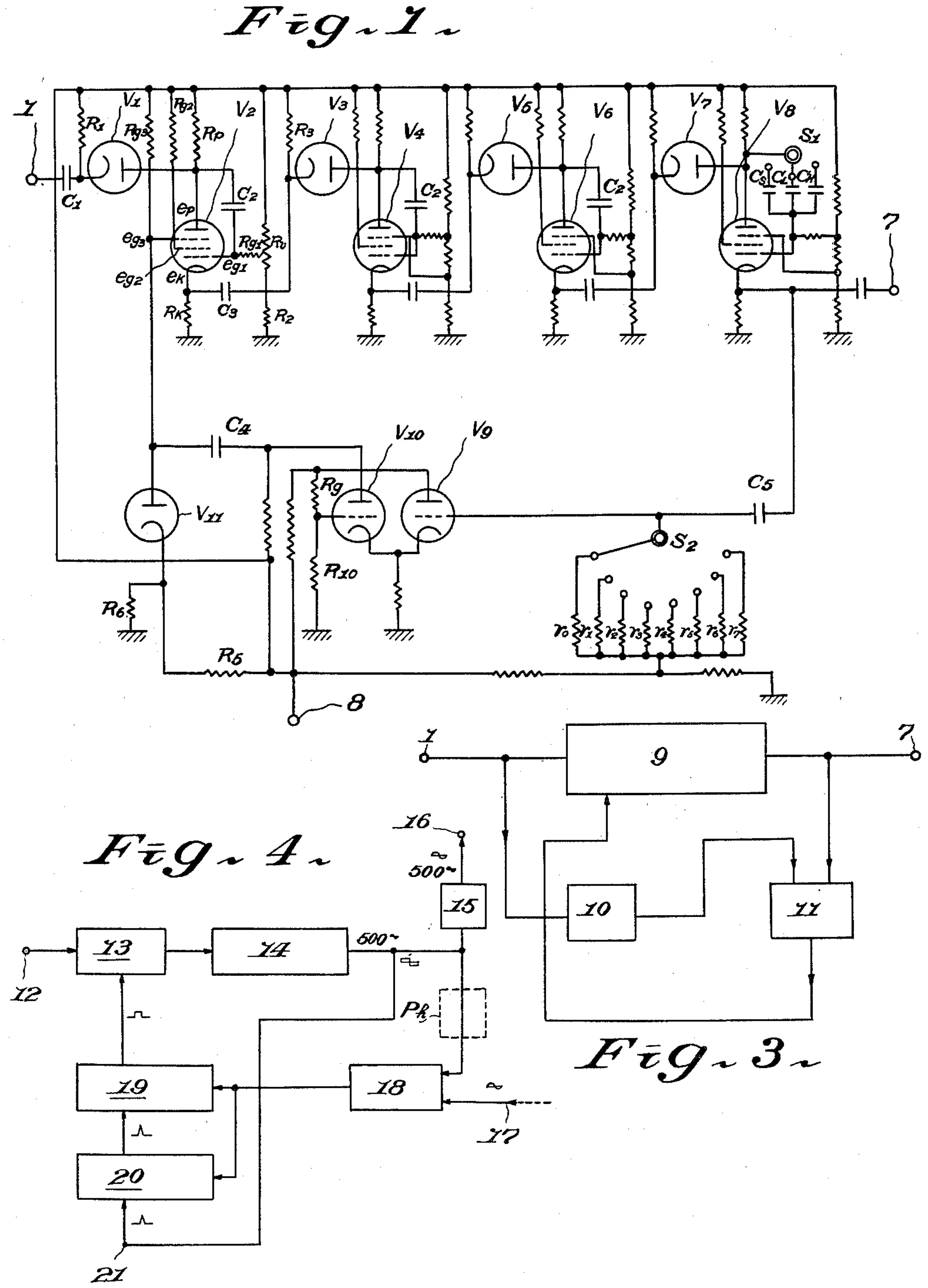

Referring to Fig. 1, the input terminal 1 is supplied with the wave obtained by dividing an output wave of 100 kc./s. having been produced by an oscillator not shown, for instance, by a quartz crystal oscillator into the wave of 20 kc./s., the time interval between the adjacent wave elements of said wave being made equal to 50 $\mu$s., and said dividing being made by a suitable frequency divider of stationary type. The circuit comprises a differential circuit consisting of a condenser $C_1$ and a resistance $R_1$, diode tubes $V_1$, $V_3$, $V_5$ and $V_7$ or equivalent circuit elements which are, respectively, used for locking the transmission of the positive pulse elements, coupling condensers $C_3$, and multielectrode tubes $V_2$, $V_4$, $V_6$ and $V_8$, each composing a so-called phantastron circuit. In this embodiment, each phantastron circuit is formed by one multielectrode tube, but it may be formed by several multielectrode tubes. Each of the tubes $V_2$, $V_4$ and $V_6$ comprises a first grid resistance $R_{g1}$; a second grid resistance $R_{g2}$; a third grid resistance $R_{g3}$; an anode resistance $R_p$; a cathode resistance $R_k$; voltage dividing resistances $R_v$ and $R_2$ for supplying the first grid of said tube with a suitable voltage; and a condenser $C_2$ for the determination of the frequency dividing ratio. The tube $V_8$ in the last stage comprises the same circuit elements as the other tubes $V_2$, $V_4$ and $V_6$ except that in the tube $V_8$, condensers $C_s$, $C_L$ and $C_H$ are used, instead of the condenser $C_2$, for the determination of the frequency dividing ratio of the last stage, said condensers being switched in or out of the circuit by a switch $S_1$.

The circuit embodied in Fig. 1 contains also electronic tubes $V_9$ and $V_{10}$ composing a monostable multivibrating circuit or the like; a time constant circuit for determining the time width of the output rectangular wave of said multivibrating circuit, said time constant circuit consisting of the resistances $r_o$–$r_7$, a coupling condenser $C_5$ and a switch $S_2$ for the selective connection of any one of said resistances; a diode tube $V_{11}$ (or an artificial circuit equivalent to said tube) for protecting the voltage of the third grid of the tube $V_2$ from becoming positive; voltage dividing resistances $R_5$ and $R_6$ which supply said third grid with a grid voltage through the tube $V_{11}$; an output terminal 7; and an input terminal 8 for the electric voltage source. In this circuit, the numerals 2–6 are the marks for describing the operation of the circuit.

In the embodiment in Fig. 1, when the circuit constants of the circuits are suitably selected and only the tube $V_9$ forming the monostable multivibrating circuit is set in operative state and the tube 10 is set in inoperative state, the states of the tubes $V_9$ and $V_{10}$ are not varied even when a positive pulse is introduced into the grid of the tube $V_9$ through the condenser $C_5$. However, upon introduction of a negative pulse into the grid circuit of the tube $V_9$, the grid voltage of the tube $V_9$ becomes negative causing the rise of the plate voltage thereof, whereby the grid voltage of the tube $V_{10}$ rises through the resistances $R_8$ and $R_{10}$ and the tube $V_{10}$ becomes conductive, thus causing lowering of the plate voltage thereof. Next, after elapse of a predetermined time established by the time constant of the circuit consisting of the condenser $C_5$ and any one of the resistances $r_o$–$r_7$, the grid voltage of the tube $V_9$ is restored to its original state, so that the tube $V_9$ becomes conductive again and the tube $V_{10}$ becomes nonconductive, whereby a negative rectangular wave (it will be described as a check pulse in the following of this specification for the simplification thereof) is given to the third grid $e_{g3}$ of the tube $V_2$. In this case, the time width of said check pulse can be varied by the switch $S_2$ to any suitable value such as, for instance, 500 $\mu$s., 450 $\mu$s., 400 $\mu$s., 350 $\mu$s., 300 $\mu$s., 250 $\mu$s., 200 $\mu$s or 150 $\mu$s. When said check pulse is introduced to the anode side of the tube $V_{11}$, the third grid voltage $e_{g3}$ of the tube $V_2$ is protected from its variation towards positive direction by the action of the tube $V_{11}$.

In the stationary state of the tube $V_2$ composing a phantastron circuit, any plate current does not flow through said tube, because the third grid circuit of said tube $V_2$ is maintained in its nonconductive state. It is assumed that the frequency dividing ratio in the above case is 1/10. Now, when an input pulse such as, for instance, the pulse having time interval of 50 $\mu$s. is applied to the input terminal 1, this pulse is, after its differentiation by the circuit consisting of the condenser $C_1$ and resistance $R_1$ and removal of the positive pulse elements thereof by the tube $V_1$, introduced into the tube $V_2$ in the wave form such as shown by $Aa$ in Fig. 2($a$). In this case, when such a check pulse having time width of 500 $\mu$s. as shown by full line of the wave $e_{g3}$ in Fig. 2($a$) is supplied to the third grid of the tube $V_2$, the voltages of the plate electrode, the first grid, the second grid and the cathode of the tube $V_2$ are varied in such forms as shown, respectively, by full lines of the waves $e_p$, $e_{g1}$, $e_{g2}$ and $e_k$ in Fig. 2($a$). The time width of said pulse is made short within the input pulse interval (in this embodiment, within 50 $\mu$s.) to avoid any erroneous operation, but this countermeasure is not necessary when a binary circuit such as bistable multivibrator is used in the place of the tube $V_4$ of phantastron type.

During application of said check pulse to the tube $V_2$, the third grid voltage of said tube $V_2$ is maintained in its nonconductive value even when a pulse is introduced into the input terminal 1, so that the tube $V_2$ does not operate because of zero of its anode current. However, upon cease of said check pulse, the tube $V_2$ is made to operate by the next input pulse introduced into the input terminal 1, whereby the plate voltage of the tube $V_2$ decreases, thus causing the establishment of nonconductive state of the tube $V_1$, so that the operation of the tube $V_2$ can not be affected by the input pulse introduced into the terminal 1. After elapse of a predetermined time (in this embodiment, the frequency dividing ratio is 1/10 and time interval of the input pulse is 50 $\mu$s., so that said predetermined time is $50\times10=500$ $\mu$s.), the tube $V_2$ is restored to its stationary state and can operate again by the next input pulse. The above-mentioned operations are repeated in such a manner as described above, whereby the pulse having been differentiated in the circuit consisting of the condenser $C_3$ and the resistance $R_3$, and divided into 1/10 in its frequency is led out from the cathode of the tube $V_2$ and introduced into the frequency dividing circuit of the next stage. This pulse is shown by the wave form $Ba$ in Fig. 2($a$).

The frequency dividing circuit of the next stage comprising the tube $V_4$ is almost the same as the circuit comprising the tube $V_2$ except that in the former circuit, a constant voltage is applied to the third grid from a voltage dividing resistance and the frequency dividing ratio is selected so as to be 1/2. The frequency dividing circuit of the third stage comprising the tube $V_6$ is made to operate by the output pulse of tube $V_4$, the frequency dividing ratio of said circuit being selected so as to be 1/5. The frequency dividing circuit of the last stage comprising the tube $V_8$ is connected so that the frequency dividing ratio of said circuit can be varied so as to be 1/5, 1/4, or 1/3 by connecting, respectively, the condenser $C_s$, $C_L$ or $C_H$ into the circuit by changing over the switch $S_1$. The cathode voltage of the tube $V_8$ is led out toward the output terminal 7 and a part of said voltage is supplied to the monostable multivibrator consisting of the tubes $V_9$ and $V_{10}$ through a condenser $C_5$.

Figure 2A:
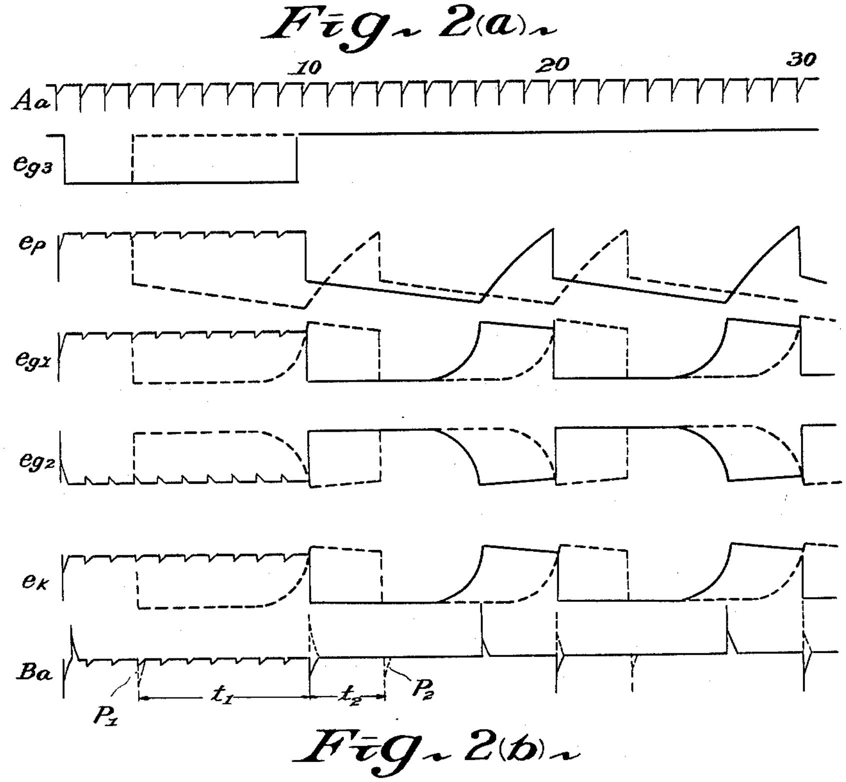
Figure 2B:
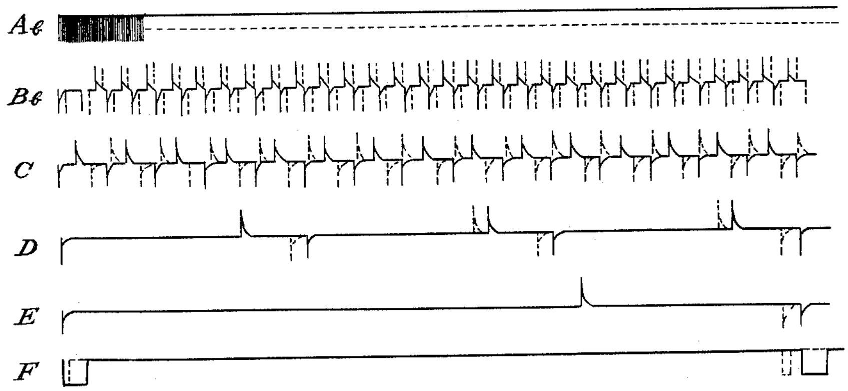

In Fig. 2($b$) are shown various wave forms for indicating the operations of the above-mentioned frequency dividing circuits; in which:

The wave $Ab$ shows the input pulse having time interval of 50 $\mu$s. and introduced into the input terminal 1.

The wave $Bb$ shows the output pulse of the tube $V_2$.

The wave C shows the output wave of the tube $V_4$, that is, the wave at the position 3, the time interval between the adjacent negative pulse elements of said wave being 1000 $\mu$s.

The wave D shows the output wave of the tube $V_6$, that is, the wave at the position 4, the time interval between the adjacent negative pulse elements of said wave being 5000 $\mu$s.

The wave E shows the output pulse of the tube $V_8$ in the case, in which the frequency dividing ratio of the tube $V_8$ is set to 1/3 by connection of the condenser $C_H$ in the circuit, the time interval between the adjacent negative pulse elements of said wave being 15,000 $\mu$s. In this case, the frequency dividing ratio is as follows.

$$\frac{1}{10}\times\frac{1}{2}\times\frac{1}{5}\times\frac{1}{3}=\frac{50}{15,000}=\frac{1}{300}$$

The wave F shows the check pulse to be applied to the third grid of the tube $V_2$.

The full line waves in Figs. 2(*a*) and 2(*b*) correspond to the case in which the time width of the check pulse is 500 $\mu$s., but the frequency dividing ratio of the tube $V_2$ is 1/10 and the time interval of the input pulse is 50 $\mu$s. so that any variation will not occur in the time interval of the output pulse of the tube $V_2$ and in that of the tube $V_8$ even when the check pulse is introduced. However, when the time width of the check pulse is selected so as to be 150 $\mu$s., the output waves at the various positions take the forms as shown by broken lines in Figs. 2(*a*) and 2(*b*), whereby the pulse time interval is shortened by 50×3 $\mu$s. as shown in the wave F in Fig. 2(*b*) and the frequency dividing ratio is made to vary from 1/300 to 1/293. That is to say, as indicated by $p_1$ of the wave B*a* in Fig. 2(*a*), $t_1$ becomes equal to 50×7 $\mu$s. and is shifted by 50×3 $\mu$s., so that as indicated in the waves A*b*, B*b*, C, D, E and F of Fig. 2(*b*), the time interval of the pulse is shortened and the frequency dividing ratio varies. In this case, however, it is necessary to shorten the time constant of the first grid circuit of the tube $V_4$, for instance, from 500×2 $\mu$s. to 800 $\mu$s. so as to be able to lead out the pulse $p_1$. If said shortening of the time constant is not adopted, the pulse $p_1$ can not be led out and the pulse $p_2$ is first taken out, so that it is attainable to prolong the pulse time interval by $t_2$ (50×3 $\mu$s.). As described above, it is possible to vary minutely the frequency dividing ratio by varying the time width of the check pulse.

In the above embodiment, the check pulse is made to generate by using a monostable multivibrator and the output pulse of the frequency divider. However, this invention may be also embodied by using a bistable multivibrator such as shown schematically in Fig. 3. The circuit in Fig. 3 comprises a frequency divider 9 consisting of the frequency dividing circuits comprising the tubes such as shown by $V_1$–$V_8$ in Fig. 1, an input terminal 1, an output terminal 7, a frequency divider 10 capable of being varied in its frequency dividing ratio, and a bistable multivibrator 11 or the like.

The input terminal for controlling said multivibrator 11 is supplied with both the output pulse of the frequency divider 10 and a part of the output pulse of the frequency divider 9 to form a check pulse having the time width corresponding to the difference between said two pulses. According to the device in Fig. 3, any desirable frequency dividing ratio can be obtained by ceasing the function of the frequency divider 9 for a time by introducing said check pulse into said divider. In this embodiment also, the frequency dividing ratio can be varied by varying the frequency dividing ratio of the frequency dividing circuit of the last stage of the divider 9 as in the case of embodiment in Fig. 1 or by varying the frequency dividing ratio of the frequency divider 10.

The embodiment in Fig. 4 comprises an input terminal 12 for the stable high frequency pulse, a phantastron frequency dividing circuit 13; a frequency dividing circuit 14 formed by cascade connection of several stages of phantastron frequency dividing circuits or binary multiple frequency dividing circuits; a filter circuit 15 which transforms its input wave into a sine wave; an output terminal 16 for the wave to be controlled; an input terminal 17 for the standard wave; a phase discriminating circuit 18 which produces a direct current voltage of zero, positive or negative value in accordance with the phase difference between two kinds of alternating current inputs having same frequency and almost same amplitude; a circuit 19 capable of producing a control pulse and comprising a multivibrator or the like as its main circuit element; and a circuit 20 capable of producing variable pulse and comprising a phantastron oscillating circuit or the like as its main circuit element. The filter 15 may be, if necessary, omitted.

Figures 5, 6:
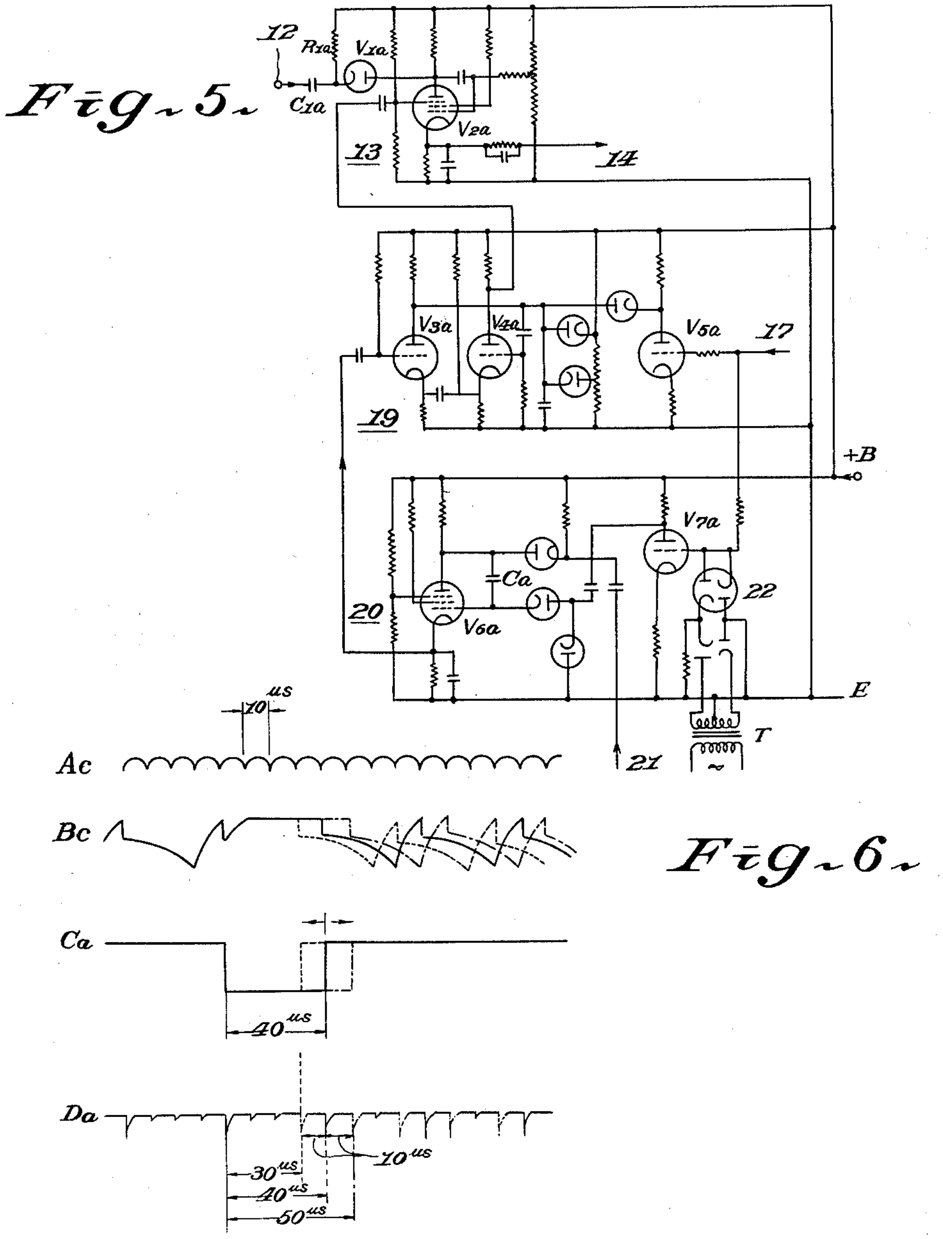
Fig. 5 is a connection diagram of the main part of the circuit embodied in Fig. 4.
Fig. 6 shows the wave forms for describing the operation of the circuit embodied in Fig. 4.

In Fig. 5 is shown a connection diagram of the circuit for showing minutely the phantastron frequency dividing circuit 13, the control pulse generating circuit 19, and the variable pulse generating circuit 20 in Fig. 4.

The operation of the device embodied in Figs. 4 and 5 will be described in the following in connection with the case, in which the frequency of the standard input wave introduced from the input terminal 17 is 500 cycles per second and an output wave having frequency and phase identical with those of said input wave is to be obtained.

The stable high frequency introduced into the terminal 12 is first converted into the pulse of 100 kc./s. by any oscillator such as quartz crystal oscillator, and the frequency dividing ratio of the phantastron frequency dividing circuit 13 and the resultant frequency dividing ratio of the frequency dividing circuit 14 are selected, respectively, so as to 1/4 and 1/50. Thus, the stable high frequency pulse supplied to the terminal 12 is introduced into the frequency dividing tube $V_{2a}$ through the differentiation circuit ($C_{1a}$ and $R_{1a}$) and the diode tube $V_{1a}$, and then introduced, after division thereof into 25 kc./s., into the frequency dividing circuit 14. The frequency of the wave introduced into the circuit 14 is again divided in this circuit so as to produce an output wave to be controlled, having a frequency of 500 cycles per second. The wave form of this output wave is rectangular, so that when a sinusoidal output wave is particularly required, it is preferable to lead out the output wave of the frequency dividing circuit 14 from the output terminal 16 through the circuit 15 which converts its input wave into a sine wave. A part of said output wave of 500 cycles per second and the standard input wave of 500 cycles per second introduced from the terminal 17 are introduced into the phase discriminating circuit 18. In this case, when said output wave to be controlled is introduced into said circuit 18 after phase shifting thereof by 90 degrees by a phase shifter *ph* such as shown by broken line in Fig. 4, the output voltage of the phase discriminator becomes zero in the case of coincidence of the phase of the wave to be controlled with that of the standard wave, and a direct current voltage having magnitude and polarity corresponding to the magnitude and the lagging or leading of the phase difference between said waves can be obtained. A part of said direct current voltage is led into the tube $V_{5a}$ of the control pulse generating circuit 19 so as to control the multivibrator consisting of the tubes $V_{3a}$ and $V_{4a}$, and another part of said direct current voltage is led into the tube $V_{7a}$ of the variable pulse generating circuit 20. However, since the tube $V_{7a}$ is being supplied with the output voltage of a circuit 22 which is designed so that the constant alternating current voltage supplied from the secondary side of a transformer T and having a constant frequency between scores of cycles and several hundred cycles may be passed intermittently through said circuit, a pulse having an amplitude corresponding to said direct current voltage will be produced at the output side of said tube $V_{7a}$. This pulse controls the charging time of the condenser C*a* in the phantastron circuit comprising the tube $V_{6a}$, so that the oscillation frequency of the tube $V_{6a}$ varies in accordance with the amplitude of the charging pulse thereof, that is, in accordance with the magnitude of the direct current output voltage of the phase discriminator 18. On the other hand, the above-mentioned oscillation circuit is controlled by a part of the wave to be controlled, having been introduced from the terminal 21, so that the output of said oscillation circuit is always maintained in the state synchronous to the wave to be controlled. In Figs. 4 and 5 is shown the embodiment, in which the synchronization is established by introduction of the output voltage of last stage of the frequency dividing circuit 14 into the terminal 21, but the synchronized wave may be led out from the intermediate position of said circuit.

The oscillation output of the tube $V_{6a}$ is introduced into the tube $V_{3a}$ of the control pulse generating circuit 19 so as to control the operation of said circuit, whereby the time width of the control pulse and the repeating period of the pulse elements are made to vary in accordance with the magnitude and polarity of the direct current output voltage of the phase discriminator 18.

Accordingly, when the control pulse of the control pulse generating circuit 19 is applied to the third grid of the frequency dividing tube $V_{2a}$ by selecting the circuit constant of said circuit 19 in such a manner that the pulse width becomes equal to the time width corresponding, respectively, to 40 $\mu$s., 30 $\mu$s. or 50 $\mu$s. in accordance with zero, positive polarity or negative polarity of the direct current voltage of the phase discriminator, the time interval of the oscillation pulse of the tube $V_{2a}$ can be varied in accordance with the time width of the above-mentioned control pulse. In Fig. 6 are shown the various waves showing the operation of the above-mentioned device, in which the high frequency pulse of 100 kc./s., cathode voltage of the frequency dividing tube of the phantastron frequency dividing circuit 13, control pulse, and output pulse of the frequency dividing circuit 13 are, respectively, indicated by the waves A*c*, B*c*, C*a* and D*a* corresponding to the wave obtained by differentiation of the wave B*c*. As will be seen in Fig. 6, the frequency of the pulse of 100 kc./s. is divided into 1/4 (25 kc./s.) by the frequency dividing circuit. When the time width of the control pulse is made equal to a period corresponding to one wave length of 25 kc./s. (40 $\mu$s.) as shown by full line in the wave C*a*, there is no variation in the time interval of the output pulse of the frequency dividing circuit as shown by full line in the wave D*a*. However, when the time width of the control pulse is varied, as shown, respectively, by the dotted line and chain line in the wave C*a*, to 30 $\mu$s. and 50$\mu$s., the cathode voltage of the frequency dividing tube and the output pulse of the frequency dividing circuit are made to vary in such forms as shown, respectively, by dotted line and chain line in the waves B*c* and D*a*, whereby the time interval of the output pulse is shortened by $\pm 10$ $\mu$s, that is, the phase of the output pulse lags or advances by 10 $\mu$s. Thus, when the phase difference between the output wave to be controlled and the standard input wave becomes zero, the time width of the control pulse becomes equal to 40 $\mu$s., thus causing the stop of the control action. Consequently, if the range of the phase compensating operation per control pulse is accommodated to 10 $\mu$s., the phase difference ($1/500 \times 4 = 0.5$ ms.) between the control wave to be controlled and the standard wave (500 cycles per second) can be compensated by fifty control pulses $$\left(\frac{500\mu s.}{10\mu s.}=50\right)$$

In this case, when the frequency of the high frequency pulse being stable comparing to the standard wave of 500 cycles per second is selected so as to be 100 kc./s., the accuracy of the adjustment becomes $$\frac{10}{2000}=0.5\%$$

because the phase compensation per control pulse is 10 $\mu$s. and one wave length of the wave to be controlled is 2000 $\mu$s. Accordingly, said accuracy may be further raised by shortening the time per control by increasing the frequency of the high frequency pulse.

As will be seen from the above description, according to the embodiment in Figs. 4–6, phase control can be carried out with any desirable accuracy by selecting suitably the frequency of the high frequency pulse and the oscillation frequency of the phanastron frequency dividing circuit 13 in accordance with the frequency of the standard input wave.

Furthermore, in the control of the device illustrated in Figs. 4–6, the larger the direct current output voltage of the phase discriminating circuit 18 becomes, that is, the larger the phase difference between the control output wave to be controlled and the standard input wave becomes, the higher the oscillation frequency of the tube $V_{6a}$ becomes, that is, the shorter the repeating periods of the rectangular output waves of the tubes $V_{3a}$ and $V_{4a}$ become, so that the phase of the output wave to be controlled can be shifted rapidly, and the oscillation frequency of the tube $V_{6a}$ becomes lower with the approach of the phase difference between both the waves to zero or with the decrease of the direct current output voltage of the phase discriminator 18 causing the slowing of the phase shifting of the output wave to be controlled, whereby the phase adjusting operation becomes very stable and rapid.

If it is not necessary to carry out rapid adjustment of the phase, the oscillation frequency of the tube $V_{6a}$ may be made relatively low and it is not necessary to make said oscillation frequency variable. In this case, the switching tube $V_{7a}$ and the opening and closing circuit 22 will be unnecessary.

While particular embodiments of this invention have been described and shown, it will, of course be understood that the invention would not be limited thereto, since many modifications may be made, all such modifications are within the true spirit and scope of this invention.

We claim:

A circuit arrangement for use as an automatic phase synchronizing circuit for synchronizing the phase of an output wave form with a standard wave form and for use in a variable frequency dividing system comprising, in combination, at least one multiple stage chain frequency divider including at least one phantastron circuit for providing a frequency-divided output, the output wave form corresponding to the wave form whose phase is to be synchronized with a standard wave form having a different phase, means to apply an input wave form to the frequency divider, means for generating control pulses each having a predetermined duration corresponding to the phase difference between the output wave form and said standard wave form and for variably controlling the frequency dividing ratio of the frequency divider comprising, a multivibrator for generating the control pulses and applying them to the frequency divider to stop the frequency dividing operation thereof for intervals of time corresponding to the duration of the individual control pulses, means for applying the output of the chain frequency divider to the multivibrator, means for varying the width-time duration of the control pulses, and detector means for applying a detected standard wave form to said multivibrator.

References Cited in the file of this patent

UNITED STATES PATENTS

| | | |
|---|---|---|
| 2,430,570 | Hulst | Nov. 11, 1947 |
| 2,500,581 | Seeley | Mar. 14, 1950 |
| 2,768,290 | Harris et al. | Oct. 23, 1956 |
| 2,844,790 | Thompson et al. | July 22, 1958 |
| 2,858,426 | Meserve et al. | Oct. 28, 1958 |

OTHER REFERENCES

Design of Phantastron Time Delay Circuits by Close and Lebenbaum, published in Electronics, April 1948 (pages 101 through 107 relied on).